US008078107B2

(12) United States Patent  (10) Patent No.: US 8,078,107 B2
Eisenbach  (45) Date of Patent: *Dec. 13, 2011

(54) AUTOMATIC NETWORK AND DEVICE CONFIGURATION FOR HANDHELD DEVICES BASED ON BLUETOOTH DEVICE PROXIMITY

(75) Inventor: Andre Eisenbach, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/084,910

(22) Filed: Apr. 12, 2011

(65) Prior Publication Data

US 2011/0183620 A1    Jul. 28, 2011

Related U.S. Application Data

(63) Continuation of application No. 11/073,647, filed on Mar. 7, 2005, now Pat. No. 7,925,212.

(51) Int. Cl.
*H04B 7/00*    (2006.01)

(52) U.S. Cl. ... 455/41.2; 455/11.1; 455/551; 455/552.1; 455/553.1; 370/328; 370/338

(58) Field of Classification Search .................. 455/11.1, 455/13.1, 41.1, 41.2, 410, 411, 551, 552.1, 455/553.1, 168.1; 370/328, 338
See application file for complete search history.

(56) References Cited

U.S. PATENT DOCUMENTS

| | | | |
|---|---|---|---|
| 6,088,450 A | 7/2000 | Davis et al. | |
| 6,092,201 A | 7/2000 | Turnbull et al. | |
| 6,772,331 B1 | 8/2004 | Hind et al. | |
| 7,020,456 B2 | 3/2006 | Smeets et al. | |
| 7,415,242 B1 | 8/2008 | Ngan | |
| 7,424,267 B2 | 9/2008 | Eisenbach | |
| 7,463,861 B2 | 12/2008 | Eisenbach | |
| 7,756,478 B2 | 7/2010 | Eisenbach | |
| 7,796,946 B2 | 9/2010 | Eisenbach | |
| 7,925,212 B2* | 4/2011 | Eisenbach | 455/41.2 |
| 2002/0087632 A1 | 7/2002 | Keskar | |
| 2003/0083047 A1* | 5/2003 | Phillips et al. | 455/412 |
| 2003/0095521 A1 | 5/2003 | Haller et al. | |
| 2003/0114104 A1 | 6/2003 | Want et al. | |

(Continued)

FOREIGN PATENT DOCUMENTS

EP    1255383 A    11/2002

(Continued)

OTHER PUBLICATIONS

Specification of the Bluetooth System, Version 1.2, Nov. 5, 2003, pp. 1-1200.

(Continued)

*Primary Examiner* — Tuan Pham

(74) *Attorney, Agent, or Firm* — Thomas, Kayden, Horstemeyer & Risley, LLP

(57) ABSTRACT

A method, apparatus, and system for automatically configuring Bluetooth devices for communication to an outside network is described. A Bluetooth device is paired with a "trusted" Bluetooth device. When paired devices are found, the Bluetooth device automatically configures itself to use the lowest cost connection option from the available set of paired devices that are in proximity with the Bluetooth handheld device. If no device is found, the Bluetooth device may revert to a built-in access method. The network accessed can be the internet or an office network such as an 802.11 network.

22 Claims, 4 Drawing Sheets

U.S. PATENT DOCUMENTS

| | | |
|---|---|---|
| 2003/0139180 A1 | 7/2003 | McIntosh et al. |
| 2003/0199267 A1 | 10/2003 | Iwasa et al. |
| 2004/0014423 A1 | 1/2004 | Croome et al. |
| 2004/0029563 A1 | 2/2004 | Berg |
| 2004/0029619 A1 | 2/2004 | Liang et al. |
| 2004/0123106 A1 | 6/2004 | D'Angelo et al. |
| 2004/0125762 A1 | 7/2004 | Haller et al. |
| 2004/0126038 A1 | 7/2004 | Aublant et al. |
| 2004/0143750 A1 | 7/2004 | Kulack et al. |
| 2004/0203381 A1 | 10/2004 | Cahn et al. |
| 2004/0230790 A1 | 11/2004 | Zhang et al. |
| 2004/0264410 A1 | 12/2004 | Sagi et al. |
| 2005/0048919 A1 | 3/2005 | Jeannerod |
| 2005/0105734 A1 | 5/2005 | Buer et al. |
| 2005/0136834 A1 | 6/2005 | Bonta et al. |
| 2005/0266826 A1 | 12/2005 | Vlad |
| 2006/0041760 A1 | 2/2006 | Huang |
| 2006/0046709 A1 | 3/2006 | Krumm et al. |
| 2006/0083187 A1 | 4/2006 | Dekel |
| 2006/0111045 A1 | 5/2006 | Orlassino et al. |
| 2006/0199536 A1 | 9/2006 | Eisenbach |
| 2006/0199537 A1 | 9/2006 | Eisenbach |
| 2006/0199538 A1 | 9/2006 | Eisenbach |
| 2009/0047903 A1 | 2/2009 | Eisenbach |
| 2009/0093215 A1 | 4/2009 | Eisenbach |
| 2011/0003549 A1 | 1/2011 | Eisenbach |
| 2011/0007900 A1 | 1/2011 | Eisenbach |

FOREIGN PATENT DOCUMENTS

| | | |
|---|---|---|
| EP | 1450273 A | 8/2004 |
| EP | 1469659 A | 10/2004 |
| EP | 1511235 A | 3/2005 |
| WO | WO 2004019566 A2 | 3/2004 |
| WO | WO 2004031488 A | 4/2004 |
| WO | WO 2004112321 A | 12/2004 |

OTHER PUBLICATIONS

Jamaluddin J. et al., Widening Access to Broadband Hotspots Employing Bluetooth, Consumer Electronics, 2004 IEEE International Symposium on Reading, UK, Sep. 1-3, 2004, IEEE, Piscataway, NJ, USA, pp. 224-228, XP010755777, ISBN: 0-7803-8527-6.

European Search Report for European Application No. EP 05023450.9, May 12, 2006.

European Search Report for European Application No. EP 05023448.3, May 15, 2006.

European Search Report for European Application No. EP 05022891.5, Jun. 22, 2006.

* cited by examiner

AUTOMATIC NETWORK AND DEVICE CONFIGURATION FOR HANDHELD DEVICES BASED ON BLUETOOTH DEVICE PROXIMITY

CROSS-REFERENCE TO RELATED APPLICATIONS/INCORPORATION BY REFERENCE

The present application is a CONTINUATION of U.S. application Ser. No. 11/073,647, filed Mar. 7, 2005, now issued U.S. Pat. No. 7,925,212.

The present application is also related to U.S. application Ser. No. 11/074,271, filed Mar. 7, 2005, now issued U.S. Pat. No. 7,463,861; U.S. application Ser. No. 11/073,801 filed Mar. 7, 2005, now issued U.S. Pat. No. 7,427,267; U.S. application Ser. No. 12/330,998, filed Dec. 9, 2008, now issued U.S. Pat. No. 7,756,478; U.S. application Ser. No. 12/835,529, filed Jul. 13, 2010; U.S. application Ser. No. 12/207,071, filed Sep. 9, 2008, now issued U.S. Pat. No. 7,796,946; and U.S. application Ser. No. 12/881,368, filed Sep. 14, 2010.

FIELD OF THE INVENTION

Certain embodiments of the invention provide for automatically configuring a Bluetooth device to connect to the Internet through the best available from a set of available Bluetooth devices that have access to the Internet or other wide area communications service. Aspects of the invention allow a user of a Bluetooth device to seamlessly maintain connectivity without having to manage connections to wider area services as the Bluetooth device moves from the proximity of, for example, a home computer with internet access that is paired with the Bluetooth device and into the proximity of, for example, a Bluetooth equipped personal automobile.

BACKGROUND OF THE INVENTION

More and more personal data is being stored on ever smaller and more mobile devices. As the amount of mobile data increases, so does the desire to maintain connectivity to wide area networks that can support user interaction and from which information can be accessed. Bluetooth devices have tremendous flexibility in terms of what devices they may connect to, but there is a need for transparent management of background connections to wider area services so that Bluetooth users do not have to constantly concern themselves with the correct and optimum operating mode for connecting to the internet. For example, a Bluetooth equipped PDA may access the internet through a local access point at the office, through a cell phone carried by the user on the street, through a paid subscription service in a personal auto, or through a home computer at home. Presently, each time a Bluetooth equipped device moves from one environment to the other, the user must reconfigure the communication settings to establish the best link for each environment.

Further limitations and disadvantages of conventional and traditional approaches to securing personal computing devices will become apparent to one of skill in the art, through comparison of such systems with some aspects of the present invention as set forth in the remainder of the present application with reference to the drawings.

BRIEF SUMMARY OF THE INVENTION

Aspects of the invention may be found in a method and system for automatically detecting network availability and reconfiguring the handheld device based on the proximity of other Bluetooth devices, substantially as shown in and/or described in connection with at least one of the figures, as set forth more completely in the claims.

These and other advantages, aspects and novel features of the present invention, as well as details of an illustrated embodiment will be more fully understood from the following description and, drawings.

DETAILED DESCRIPTION OF THE INVENTION

Certain embodiments of the invention may be found in a method and system for detecting the proximity of Bluetooth devices with access to the Internet or a network. Certain embodiments of the invention may be found in a method and system for locating proximate Bluetooth® devices and selecting the lowest cost device for accessing the network. Additional embodiments perform these functions automatically based on the user's preferences.

Bluetooth wireless technology is set to revolutionize personal connectivity by providing freedom from wired connections. Bluetooth is a specification for a small form-factor, low-cost radio solution providing links between mobile computers, mobile phones and other portable and handheld devices. Of particular interest is Bluetooth's low power consumption and short range, coupled with the ability of Bluetooth devices to automatically detect and attach to other Bluetooth devices that are close by, typically within 10 meters or less, coupled with the ability to support reasonably high data rates in an environment where the local, Bluetooth piconet is used to access wider area networks.

About Bluetooth

Bluetooth wireless technology is an international, open standard for allowing intelligent devices to communicate with each other through wireless, short-range communications. This technology allows any sort of electronic equipment—from computers and cell phones to keyboards and headphones—to make its own connections, without wires, cables or any direct action from a user. Bluetooth is currently incorporated into numerous commercial products including laptops, PDAs, cell phones, and printers, with more products coming out every day.

How Bluetooth Works

Bluetooth is a frequency hopping spread spectrum (FHSS) radio system operating in the 2.4 GHz unlicensed band. Its low power transmissions allow a typical range of about 10 meters. Devices connect to each other to form a network known as a piconet, with up to seven active devices in the piconet. The maximum data throughput between devices is approximately 7823 kbps with the data capacity shared between devices on the piconet.

Figure 1:
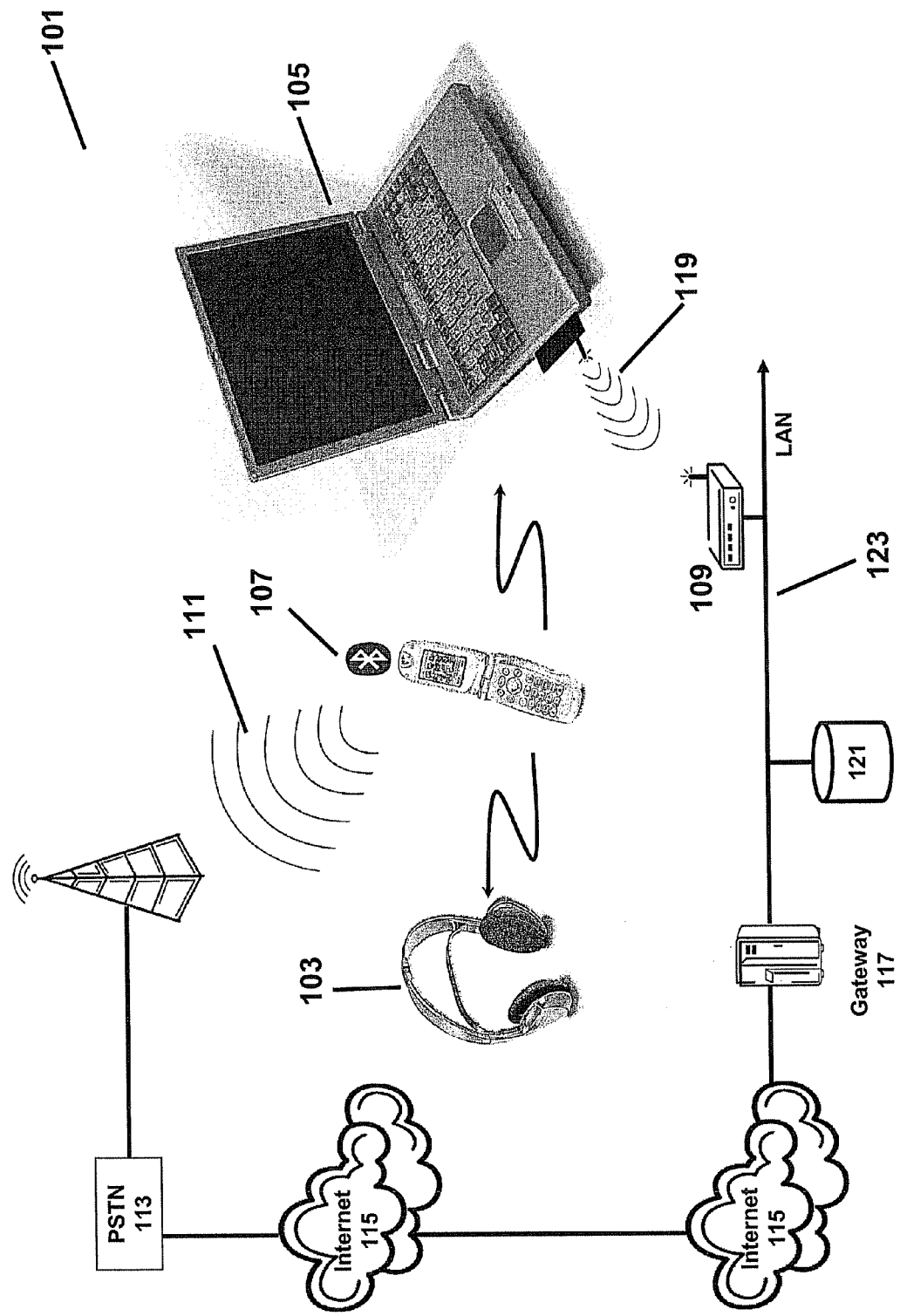
FIG. 1 is a diagram illustrating a basic Bluetooth® (BT) piconet with further connection to non-Bluetooth networks.

FIG. 1 shows a piconet 101 that includes three Bluetooth enabled devices: a headset 103, a laptop computer 105, and a cellular phone 107. Laptop 105 has a wireless radio 119 that allows it to access a local area network access point 109 using 802.11 protocols. Cellphone 107, which could also be a handheld PDA, has the ability to "dial" Internet 115 across airlink 111 using the public switched telephone network 113. LAN 123 will typically also have Internet 115 access through a gateway device 117. LAN 123 may have multiple non-Bluetooth devices associated with it, such as file server 121.

Figure 2:
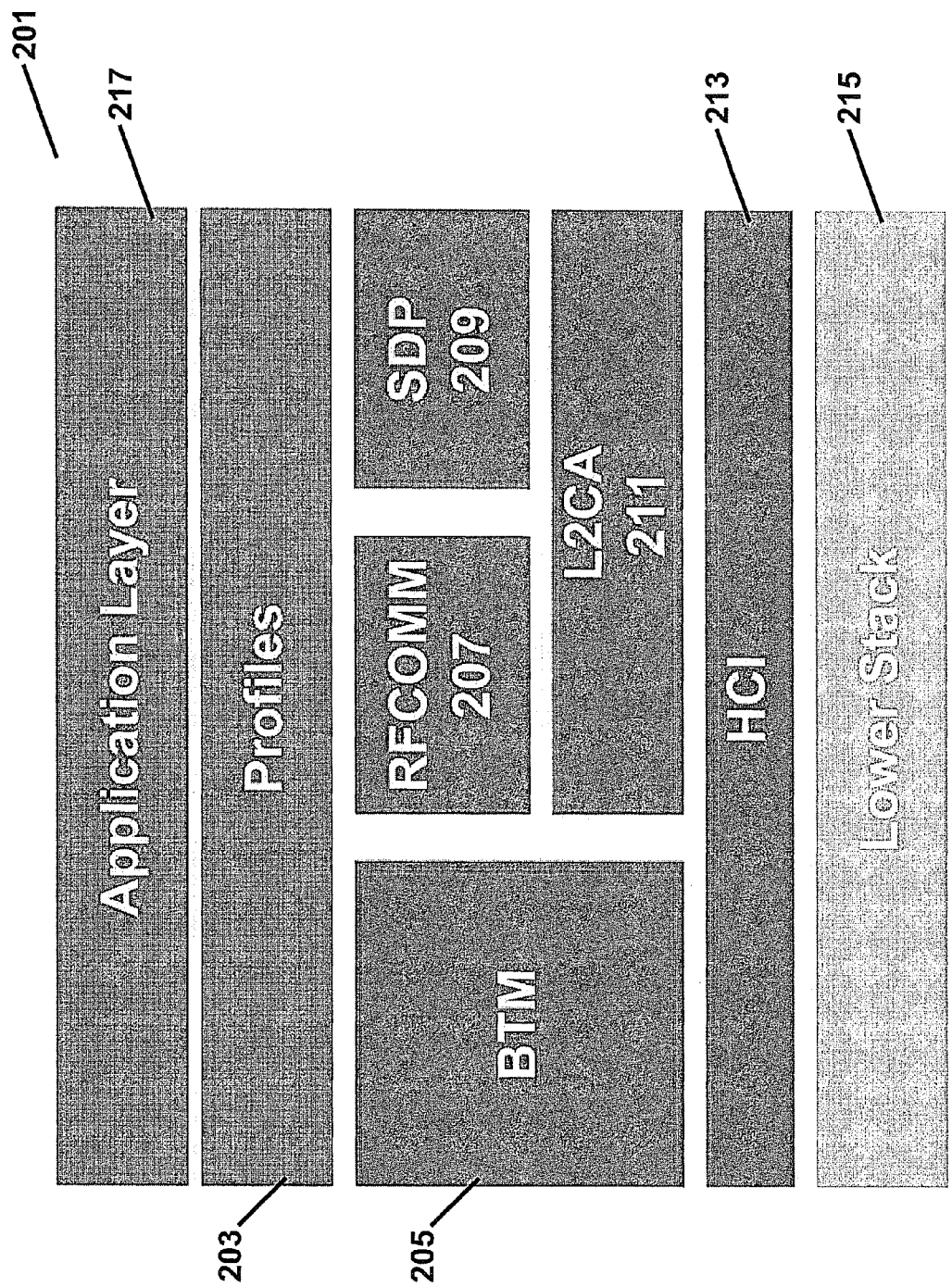
FIG. 2 is a simplified exemplary protocol stack.

Bluetooth has a protocol stack to transfer data and implement the advanced features required by applications. The protocol stack consists of several different protocols designed for different purposes. The profiles, or applications, reside above the protocol stack. Bluetooth also has a lower protocol stack for link management and baseband control. FIG. 2 is a simplified exemplary protocol stack 201. The stack includes Profiles 203, a BTM 205, RFCOMM 207, SDP 209, L2CAP 211, HCI 213, and Lower Stack 215. The application layer 217 contains the computer programs that actually implement useful tools that take advantage of the Bluetooth functionality.

Figure 3:
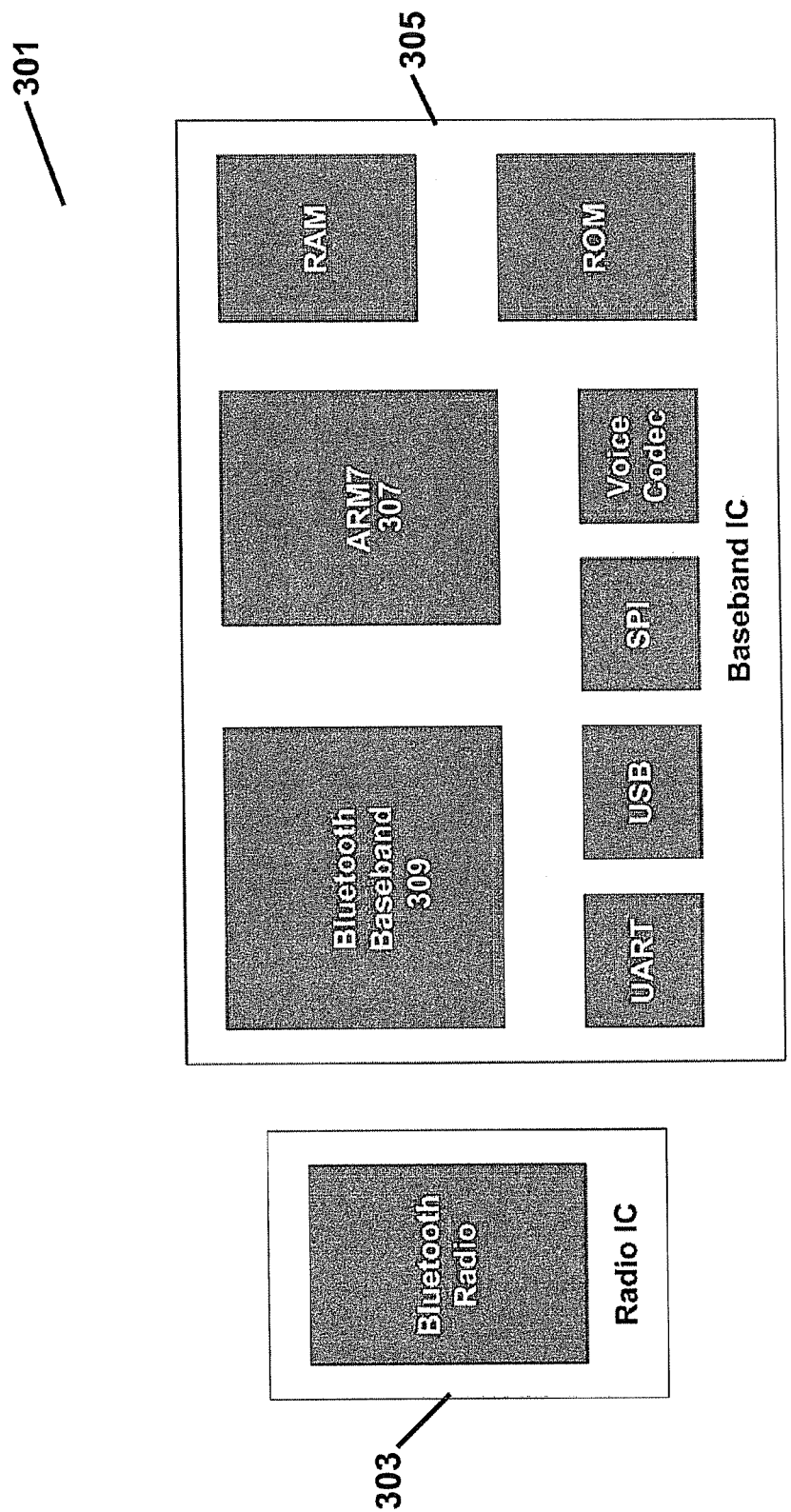
FIG. 3 is a block diagram illustrating an exemplary Bluetooth® hardware implementation, that runs the protocol stack of FIG. 2, for example, in accordance with an exemplary embodiment of the present invention.

Bluetooth hardware implementations are typically highly integrated systems consisting of one or two chips. FIG. 3 is a block diagram illustrating an exemplary Bluetooth® hardware implementation, which includes a Radio IC 303 and a Baseband IC 305.

The Bluetooth baseband chip consists of a processor core such as an ARM7 with integrated memories 307, Bluetooth baseband 309, and several other peripherals. The radio is implemented in a separate chip 303. The ARM7 processor runs all the required software including a lower stack, an upper stack, and an embedded profile. This type of single CPU implementation allows for a small, low power, low cost solution.

The software "stack" contemplates the insertion of useful applications in the higher layers of the stack. These applications can be designed to take advantage of Bluetooth's lower layers to implement functionality based on Bluetooth radio links.

The short range nature of Bluetooth wireless networking allows it to be used to establish relative location by querying which known devices are available in the area. This can be used to automatically configure network access and other settings on handheld devices. For example, if a Bluetooth enabled handheld is used in an office environment, it could detect office bound devices like Bluetooth Network access points and automatically set them up to be used for internet access, directory services etc.—transparent to the user. When the user moves out of the office, but carries a Bluetooth enabled cellular phone, network access, directory access etc. can be switched over automatically to use dial-up networking through the cell phone instead.

Bluetooth standards specify a "pairing" procedure that allows one device to associate itself with another. Pairing is described in detail in the Bluetooth 1.2 core specification, Vol. 3, Section 3.3.

In an exemplary embodiment, a system utilizes at least two Bluetooth devices. Initially, the devices are not "paired." Once devices are brought into proximity with each other, the owner can allow them to associate with each other. Once paired, the method of the invention can be employed to mark the paired device as a trusted device and configure the handheld device to use the wider network capabilities of the paired device. From then on, each device will then recognize the other and when the handheld discovers the paired device, the handheld will configure itself to use the communications facilities of that device based on the conditions set by the user. If no devices are found, the handheld can always revert to any built-in access mode, such as dial-up.

To configure, the user establishes a set of trusted devices and configures related settings. A trust relationship is established by exchanging Bluetooth link keys using the device pairing procedure and explicitly marking the device as trusted. Once such a relationship is established, the link is configured. Trusted devices could include cellular phones, desktop computers, laptop computers or specialty devices like Bluetooth key-chains. Once configured, the Bluetooth software on the handheld device performs periodic Bluetooth scans to detect trusted devices in the area, establish environments and then apply the configuration settings automatically based on the scan result. If multiple devices are found, the handheld or other Bluetooth device automatically determines the best possible network configuration. The best configuration is determined based on the relative speed or "cost" of the link.

The method may be extended beyond Bluetooth. Bluetooth may be used to establish device proximity, but once the device determines that the trusted device it is in proximity to has, for example, 802.11 capability as in an office LAN, the handheld Bluetooth device could be configured to switch to an 802.11 mode assuming that the handheld has that alternate communications ability.

The invention may be substantially integrated onto a chip, for example a Bluetooth chip, the chip having machine-readable storage having stored thereon a computer program having a code section for detecting the presence of other Bluetooth devices. The program may include at least one code section being executable by a machine for causing the machine to perform steps comprising those substantially as shown and described below.

The integrated circuit of the invention may also include an application layer that performs the methods of the invention. The integrated circuit is desirably connected to a Bluetooth radio. The integrated circuit may also have a unique hardware ID.

Figure 4:
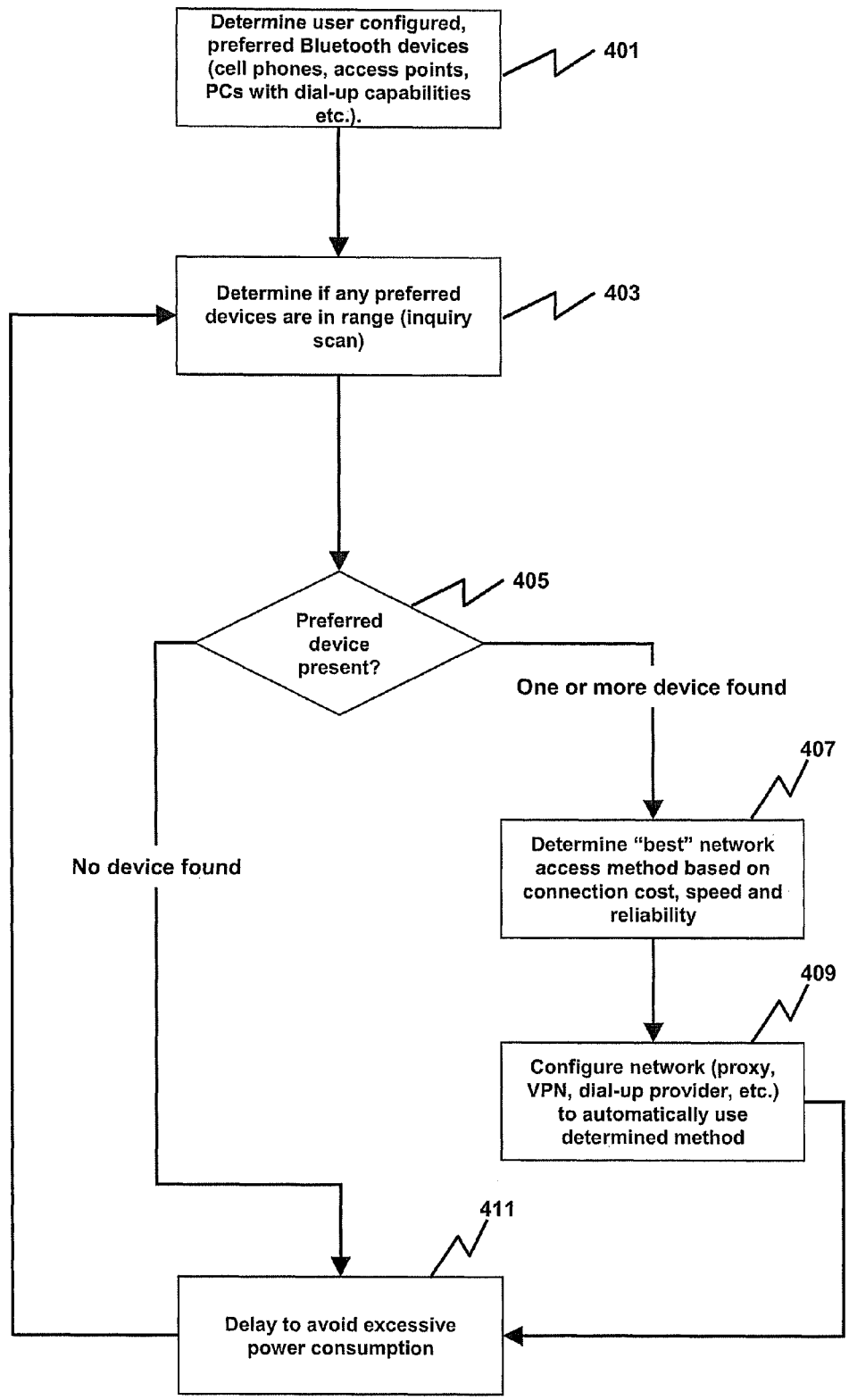
FIG. 4 is a flowchart showing one exemplary embodiment of the method of the invention, as implemented, for example, on a handheld Bluetooth device.

One exemplary embodiment of the method of the invention can be further understood in connection with FIG. 4, for example. In step 401, the handheld is configured for each paired device with a preferred mode of accessing the Internet or other network through the paired device. It is presumed that for each such device the handheld and the paired device have established a trusted relationship at some point in time. Each Bluetooth device can be manually paired with trusted devices using the Bluetooth pairing procedure. Once paired, the devices will recognize each others unique device ID which is built into all Bluetooth devices. It is contemplated that a manual pairing procedure will be done for each device the handheld might seek network access through.

As part of the setup and pairing process, the communication capabilities of the paired device are assessed. For each device, the link speed, type, and dollar cost are input to establish a virtual cost for each potential link. Any other configuration parameters unique to that particular combination are also defined, such as access numbers, codes, parity or error checking, timeouts, and any other parameters that need to be set for that particular link.

In step 403, it is presumed that an application in the handheld has requested Internet or network access. The handheld uses the Bluetooth "Inquiry" mode to determine if any trusted, preferred Bluetooth device is in range with an inquiry scan. An inquiry scan takes approximately eight seconds and allows each Bluetooth device to discover the unique identifier of nearby Bluetooth devices. Any other configuration parameters unique to that particular combination are also defined, such as access numbers, codes, parity or error checking, timeouts, and any other parameters that need to be set for that particular link.

In step 405, the handheld determines whether any preferred devices are present. If they are, then for each such device, the handheld chooses the best network access method in step 407 based on the known capabilities of each discovered device based on connection cost, speed, and quality of service. Each parameter for each discovered device is ranked by speed, link type, and dollar cost. Based on user input preferences for the relative weight to be given each parameter, the lowest virtual cost link is chosen. For example, the user could configure the selection algorithm to always select the fastest link, giving zero weight to cost. Or, the software could be weighted to always use "free" links first, and only use "costly" links when free links are not available.

Once the best device is chosen, then in step 409 the handheld will configure the network connection to use the determined method, whether it be proxy, VPN, or dial up network. The configuration is preferably automatic, relieving the user of the burden of selecting an access method and configuring the settings to use that method.

If no device is found, or if a device is found and the network connection is successfully configured, the handheld executes a delay 411 before performing the next scan 403. The delay prevents the handheld from performing excessive scans and configuration/reconfiguration thus draining the battery.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method of connecting a Bluetooth device to a wide area network, comprising:
   pairing a first Bluetooth device with a plurality of the second Bluetooth devices, wherein the first Bluetooth device comprises a Bluetooth-enabled cellular device, wherein at least one of the second Bluetooth devices is operatively coupled to the wide area network, wherein the Bluetooth-enabled cellular device connects to the wide area network through a second Bluetooth device that has the best network access to the wide area network, wherein the best network access is based on a respective weight given to a speed, a link type and a dollar cost for each second Bluetooth device, and wherein each respective weight is determined by user input preferences;
   designating communication configuration parameters for use by the first Bluetooth device in connecting to the wide area network through the second Bluetooth device;
   using the Bluetooth communications to determine when the first Bluetooth device is in proximity with the second Bluetooth device; and
   using a second wireless communications protocol in communicating with the second Bluetooth device after it is determined, using the Bluetooth communications, that the first Bluetooth device is in proximity with the second Bluetooth device.

2. The method of claim 1, wherein the Bluetooth-enabled cellular device is in inquiry scan mode when determining when the first Bluetooth device is in proximity with one of the second Bluetooth devices.

3. The method of claim 1, wherein the first Bluetooth device chooses from the plurality of second Bluetooth devices based on which device has a lowest virtual cost link to the wide area network.

4. The method of claim 1, wherein the network connection comprises an Internet connection, an 802.11 network protocol connection, or a wireless network connection.

5. A method of connecting a Bluetooth device to a wide area network, comprising:
   pairing a first Bluetooth device with a plurality of the second Bluetooth devices, wherein the first Bluetooth device comprises a Bluetooth-enabled cellular device, wherein the second Bluetooth devices are operatively coupled to the wide area network, wherein the Bluetooth-enabled cellular device connects to the wide area network through a second Bluetooth device that has a lowest virtual cost associated with connecting to the network, wherein each Bluetooth second device is characterized by a virtual cost that is a function of a link speed, a link type and a dollar cost, and wherein, once the second Bluetooth device with the lowest virtual cost is chosen, the network connection is set up as a VPN;
   designating communication configuration parameters for use by the first Bluetooth device in connecting to the wide area network through the second Bluetooth device, wherein the first Bluetooth device is configured to use communications facilities of the second Bluetooth device;
   using the Bluetooth communications to determine when the first Bluetooth device is in proximity with the second Bluetooth device; and
   using a second wireless communications protocol in communicating with the second Bluetooth device after it is determined, using the Bluetooth communications, that the first Bluetooth device is in proximity with the second Bluetooth device.

6. The method of claim 5, comprising:
   if the first Bluetooth device does not detect any of the second Bluetooth devices, using dial-up networking to access the wide area network.

7. The method of claim 5, wherein the network connection comprises an Internet connection, an 802.11 network protocol connection, or a wireless network connection.

8. The method of claim 5, wherein, if no paired device is in proximity, the first Bluetooth device connects to the wide area network by selecting a mode based on built-in capabilities of the first Bluetooth device.

9. A system for connecting a first device to a network, comprising:
   a first device that includes a Bluetooth-enabled cellular device; and a plurality of second devices, wherein the second devices comprise Bluetooth-enabled wireless devices, and wherein the second devices are operatively coupled to the network, wherein the first device is paired with the second devices, wherein the first device connects to the network through a second device that has a lowest virtual cost associated with connecting to the network, wherein each second device has a respective virtual cost that is a function of a link speed, a link type and a cost, wherein, once the second device with the lowest virtual cost is chosen, the network connection is set up as a VPN, wherein the first device is configured to use a network access mode of the second device when the first device and the second device are in proximity to each other, wherein the first device uses Bluetooth communications to determine whether the second device is in proximity to the first device, and wherein the first device uses a second wireless communications protocol in communicating with the second device after it has been determined, using the Bluetooth communications, that the second device is in proximity with the first device.

10. The system of claim 9, wherein the first device is in inquiry scan mode when determining whether any of the second devices are in proximity.

11. The system of claim 9, wherein the first device maintains connectivity with the network as the first device moves from proximity of one of the second devices to the proximity of another of the second devices.

12. The system of claim 9, wherein the first device connects to the network using a built-in access mode if none of the second devices is found.

13. A system for connecting a first device to a network, comprising:

a first device that includes a Bluetooth-enabled cellular device; and a plurality of second devices, wherein the second devices comprise Bluetooth-enabled wireless devices, and wherein the second devices are operatively coupled to the network, wherein the first device is paired with the second devices, wherein the first device connects to the network through the second device that has the best network access, wherein the best network access is based on a respective weight given to a speed, a link type and a dollar cost for each second device, wherein each respective weight is determined by user input preferences, wherein the first device uses Bluetooth communications to determine whether the second device is in proximity to the first device, wherein the first device uses a second wireless communications protocol in communicating with the second device after it has been determined, using the Bluetooth communications, that the second device is in proximity with the first device, and wherein the first device uses the second wireless communications protocol to connect with the second device to facilitate connecting the first device with the network.

14. The system of claim 13, wherein, if the first device does not detect any of the second devices, the first device is configured to use dial-up networking to access the network.

15. The system of claim 13, wherein the network comprises an 802.11 network, an Internet, a wide area network, or a local area network.

16. The system of claim 13, wherein the first device connects to the network without going through the second devices by using a built-in access mode, and wherein the first device determines whether to connect to the network through one of the second devices or through the built-in access mode based on a weighting of connection parameters.

17. An integrated circuit that performs a method, the method comprising:

pairing a first Bluetooth device and a plurality of second Bluetooth device, wherein the first Bluetooth device comprises a Bluetooth-enabled cellular device, wherein at least one of the second Bluetooth devices is operatively coupled to a wide area network, wherein the Bluetooth-enabled cellular device connects to the wide area network through a second Bluetooth device that has the best network access to the wide area network, wherein the best network access is based on a respective weight given to a speed, a link type and a dollar cost for each second Bluetooth device, and wherein each respective weight is determined by user input preferences;

configuring the first Bluetooth device to use communications facilities of the second Bluetooth device;

determining when the first Bluetooth device is in proximity with the second Bluetooth device using Bluetooth communications; and using a second wireless communications protocol in communications between the first Bluetooth device and the second Bluetooth device after it is determined, using the Bluetooth communications, that the first Bluetooth device is in proximity with the second Bluetooth device.

18. The method performed by the integrated circuit of claim 17, wherein, if the first Bluetooth device does not detect any of the second Bluetooth devices, the first Bluetooth device uses dial-up networking to access the wide area network.

19. The method performed by the integrated circuit of claim 17, wherein a lowest cost connection is selected from among the plurality of second Bluetooth devices.

20. The method performed by the integrated circuit of claim 17, wherein a built-in communication mode is selected in the event that none of the plurality of second Bluetooth devices are found using Bluetooth communications.

21. The method performed by the integrated circuit of claim 17, wherein the wide area network comprises the Internet or a local area network.

22. The method performed by the integrated circuit of claim 17, wherein the first Bluetooth device is in inquiry scan mode when determining when the first Bluetooth device is in proximity with one of the second Bluetooth devices.

* * * * *

UNITED STATES PATENT AND TRADEMARK OFFICE
CERTIFICATE OF CORRECTION

PATENT NO. : 8,078,107 B2
APPLICATION NO. : 13/084910
DATED : December 13, 2011
INVENTOR(S) : Eisenbach It is certified that error appears in the above-identified patent and that said Letters Patent is hereby corrected as shown below:

IN THE CLAIMS:

Column 5, claim 1, line 55, please remove "the".

Column 6, claim 5, line 26, please remove "the".

Column 8, claim 17, line 16, please replace the first instance of "device" with --devices--.

Signed and Sealed this
Tenth Day of April, 2012

David J. Kappos
*Director of the United States Patent and Trademark Office*